(12) United States Patent
Schmidt et al.

(10) Patent No.: US 8,521,848 B2
(45) Date of Patent: Aug. 27, 2013

(54) DEVICE SENSOR AND ACTUATION FOR WEB PAGES

(75) Inventors: Albrecht Schmidt, Satteldorf (DE); Nicolas Villar, Cambridge (GB); James Scott, Cambridge (GB); Stephen Edward Hodges, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 177 days.

(21) Appl. No.: 13/171,439

(22) Filed: Jun. 28, 2011

(65) Prior Publication Data

US 2013/0007192 A1 Jan. 3, 2013

(51) Int. Cl.
*G06F 15/16* (2006.01)
*G06F 15/173* (2006.01)
*G06F 3/00* (2006.01)

(52) U.S. Cl.
USPC ............ 709/219; 709/224; 709/246; 715/708

(58) Field of Classification Search
USPC ................. 709/204–207, 217–219, 223–224, 709/246–247; 715/700–701, 708, 744, 866
See application file for complete search history.

(56) References Cited

U.S. PATENT DOCUMENTS

| | | | |
|---|---|---|---|
| 6,714,778 B2 | 3/2004 | Nykanen et al. | |
| 7,427,926 B2* | 9/2008 | Sinclair et al. | 340/4.2 |
| 8,190,907 B2* | 5/2012 | Tu | 713/186 |
| 8,391,786 B2* | 3/2013 | Hodges et al. | 455/41.2 |
| 2001/0040590 A1* | 11/2001 | Abbott et al. | 345/700 |
| 2004/0153373 A1 | 8/2004 | Song et al. | |
| 2005/0021765 A1* | 1/2005 | Flores et al. | 709/228 |
| 2005/0198525 A1* | 9/2005 | Trossen et al. | 713/200 |
| 2006/0005156 A1* | 1/2006 | Korpipaa et al. | 717/100 |
| 2007/0110010 A1* | 5/2007 | Kotola et al. | 370/338 |
| 2007/0208751 A1* | 9/2007 | Cowan et al. | 707/10 |
| 2008/0036591 A1* | 2/2008 | Ray | 340/540 |
| 2010/0146383 A1* | 6/2010 | Kim et al. | 715/238 |
| 2010/0299615 A1 | 11/2010 | Miluzzo et al. | |
| 2010/0323730 A1* | 12/2010 | Karmarkar | 455/466 |
| 2011/0063098 A1* | 3/2011 | Fischer et al. | 340/439 |
| 2012/0158516 A1* | 6/2012 | Wooten et al. | 705/14.66 |
| 2012/0223884 A1* | 9/2012 | Bi et al. | 345/158 |
| 2012/0240223 A1* | 9/2012 | Tu | 726/19 |

(Continued)

OTHER PUBLICATIONS

Gellersen, et al., "Multi-Sensor Context-Awareness in Mobile Devices and Smart Artifacts", Mobile Networks and Applications, vol. 7, No. 5, Oct. 2002, pp. 17.

(Continued)

*Primary Examiner* — Brendan Higa
(74) *Attorney, Agent, or Firm* — Tracy S. Powell; Powell IP Law, PLLC

(57) ABSTRACT

An embedded device sensor and actuation web page access system and method for providing a web application (such as a web page) access to sensor data about an embedded device and access to actuation mechanisms (such as vibration) associated with the device. The system and method can use the sensor data to obtain context information about the embedded device and understand what a user of the device is doing at any given moment. The sensor data can be used by the web application to influence how content is served up to the user. In some embodiments, the sensor data is provided to the web server using the headers in HTTP requests. Moreover, actuation commands for actuation mechanisms on the embedded device are provided using the headers of HTTP responses. Embodiments of the system and method provide a website access to sensor data and actuation commands without changing website operation.

19 Claims, 5 Drawing Sheets

(56) References Cited

U.S. PATENT DOCUMENTS

2013/0007809 A1* 1/2013 Hays ............................ 725/47
2013/0024756 A1* 1/2013 Basso et al. ................. 715/202
2013/0039531 A1* 2/2013 Basso et al. ................. 382/103
2013/0078976 A1* 3/2013 Naftolin ....................... 455/418

OTHER PUBLICATIONS

Ostmark, et al., "A wireless network of EIS Devices", Instrumentation and Measurement Technology Conference, May 18-20, 2004, pp. 1199-1202.

Coppola, et al., "Context-Aware Browser", Nov. 12, 2009, pp. 1-16.

Salman, et al., "UCML: Ubiquitous Control Modeling Language for Android Platform", Fourth International Conference on Next Generation Mobile Applications, Services and Technologies (NGMAST), Jul. 27-29, 2010, pp. 112-116.

"How to receive sensor input, eg. gyroscope? (existing technology or future proposals)", Retrieved at <<http://webmasters.stackexchange.com/questions/4242/how-to-receive-sensor-input-eg-gyroscope-existing-technology-or-future-propos>>, Retrieved Date: Mar. 10, 2011, pp. 2.

* cited by examiner

DEVICE SENSOR AND ACTUATION FOR WEB PAGES

BACKGROUND

Embedded devices (such as mobile smartphones) typically have a variety of sensors and actuation mechanisms. These sensors include accelerometers, location devices, and temperature that provide insight to the current context of the embedded device. For example, using one or more sensors on a mobile smartphone, it can be determined whether the user is running, walking, or driving. Actuation mechanisms are used in embedded devices to alert or notify the user. These actuation mechanisms include vibration feedback and audio feedback.

It has become easier to develop and distribute applications for embedded devices that take advantage of the sensors and actuation mechanisms available on those devices. Moreover, these embedded devices typically can access the Internet to browse web pages and also to use cloud services. Generally speaking, however, It is easier to create and develop web pages than to develop the applications for embedded devices. This is because on-device applications are more difficult than websites to distribute and update.

Current approaches that seek to removing barriers to developing these applications are focused on using applications on the embedded device rather than websites. This is in part because on-device applications have access to most (if not all) the sensor data of the device, but web-based applications typically do not. This is because embedded devices typically do not make sensor data available for export to outside applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the embedded device sensor and actuation web page access system and method allow a web application (such as a web page) to access sensor data from an embedded device as well as actuation mechanisms associated with the device. As explained in detail below, the embedded device has sensors and some type of actuation mechanism, either built-in to the device or as peripheral devices. Moreover, there is some type of communication with the Web-based application that is running outside of the embedded device on a web server. In some embodiments the mechanism of a dynamic web page request is used to cause web applications running in a cloud computing environment to be able to input sensor data from the embedded device and to drive actuation on the device.

Embodiments of the embedded device sensor and actuation web page access system and method facilitate a web application's access sensor data about an embedded device and the ability to control outputs and actions of the embedded device. While a normal web page access only supports limited input from the mobile device (such as a referrer page) and can only use limited forms of output (such as drawing on the screen), embodiments of the system and method extend this by giving web pages access to input resources such as sensor data and providing output functionality (such as enabling vibration motor access or audio output on the embedded device).

Embodiments of the embedded device sensor and actuation web page access system and method can use the sensor data to obtain context information about the embedded device to understand what the user is doing at any given instant. This enables a richer experience on the embedded device by making sensor data on the device available to a web application on a web server and giving the application the ability to provide actuation on the embedded device.

Embodiments of the system and method also use the sensor data to influence how data is output to the user. For example, if the sensor data (through the accelerometer and GPS) indicates that the context of the embedded device is that the user is running at a train station, then the content sent to the device by the web server may be a slightly different and customized version of the webpage. In other words, the content sent and displayed would take into account that the user is running. This may include using larger fonts and displaying high-level information, such as the departure time of the next train from this station. This information is based on the sensor data from the phone, such as the location data from the GPS to know what train station the user is at and the fact that the user is running, thereby inferring that the user is late.

In addition, embodiments of the embedded device sensor and actuation web page access system and method can provide the website access to sensor data about the embedded device without changing the way that websites work. This is because of the way sensor data is provided to the web server using in an HTTP header. Providing the sensor data in this manner means that the only changes that are made are to change the HTML code that the website designer has written. There is no need to change the web server or the machines that they are running on. No changes need to be made to the embedded device. Thus, embodiments of the system and method are very lightweight.

Embodiments of the embedded device sensor and actuation web page access system and method bridge the gap between device sensors and cloud-hosted applications such that the sensor data is available not only to the embedded device but also to cloud-hosted applications. Embodiments of the system and method are easily deployed on a standard web server. Moreover, unlike on-device applications, embodiments of the system and method do not require the user to register for the application store, or require a developer to get his application approved by the application store. Moreover, there is an ease of updating the application, because users do not need to download the application again from the application store. The application is updated on the server in the cloud computing environment.

It should be noted that alternative embodiments are possible, and steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of embodiments of a embedded device sensor and actuation web page access system and method reference is made to the accompanying drawings, which form a part thereof, and in which is shown by way of illustration a specific example whereby embodiments of the mobile device sensor and actuation web page access system and method may be practiced. It is to be understood that other embodiments may be utilized and structural changes may be made without departing from the scope of the claimed subject matter.

I. System Overview

Figure 1:
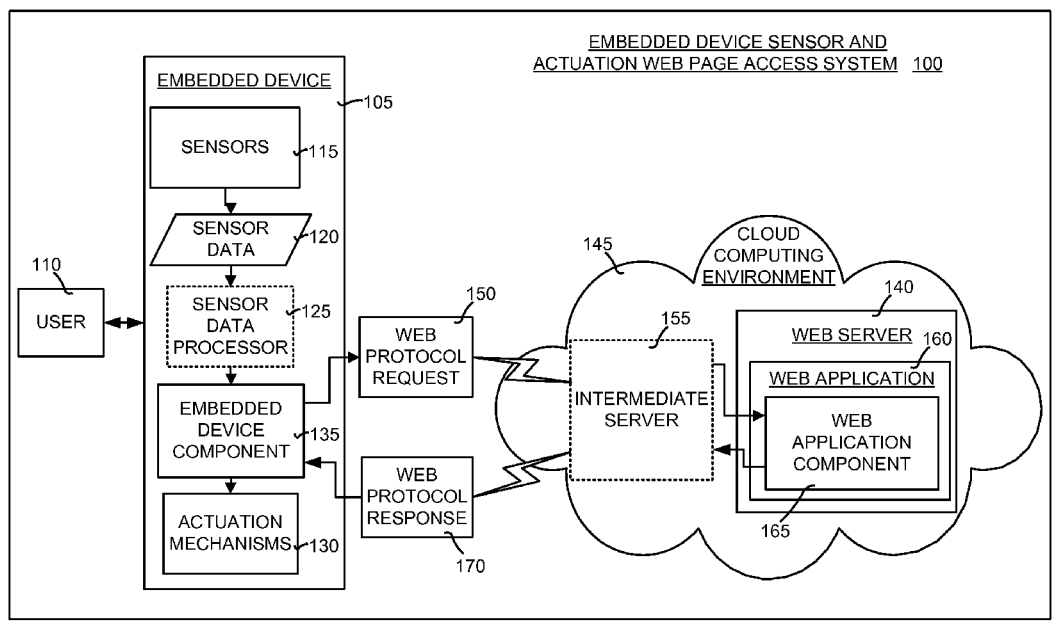
FIG. 1 is a block diagram illustrating a general overview of embodiments of the embedded device sensor and actuation web page access system and method implemented in a computing environment.

Embodiments of the embedded device sensor and actuation web page access system and method make sensor data about an embedded device as well as actuation mechanisms on the device available to a web application (such as a web page). FIG. 1 is a block diagram illustrating a general overview of embodiments of the embedded device sensor and actuation web page access system and method implemented in a computing environment.

As shown in FIG. 1, embodiments of the embedded device sensor and actuation web page access system 100 and method include an embedded device 105 (such as a mobile smartphone) that is being used by a user 110. The embedded device 105 includes sensors 115 for providing sensor data 120 about the embedded device 105. This sensor data about the embedded device 105 includes information directly about the embedded device 105 (such as provided by an accelerometer), information about the environment surrounding the embedded device 105 (such as the temperature of the room that the embedded device is in), or both. Moreover, although for ease of illustration the sensors 115 in FIG. 1 are shown residing on the embedded device 105, in some embodiments the sensors 115 reside off the embedded device 105, yet still provide sensor data 120 about the embedded device 105.

In some embodiments, the sensor data 120 is preprocessed by a sensor data processor 125. This is an optional process as indicated in FIG. 1 by the dashed lines around the sensor data processor 125. Although the sensor data processor 125 is shown in FIG. 1 residing on the embedded device 105, in other embodiments the sensor data processor 125 resides off the embedded device.

The embedded device 105 also includes one or more actuation mechanisms 130. These actuation mechanisms 130 provide audio, visual, and haptic feedback to the user 110. For example, a vibration motor on the embedded device 105 will vibrate when activated to provide haptic feedback to the user 110. Another example of actuation mechanisms 130 is sending a text, an email, or calling the user 110 to provide audio feedback, visual feedback, or both.

An embedded device component 135 of embodiments of the system 100 and method resides on the embedded device 105. This embedded device component 135 receives the sensor data 120 and prepares the sensor data 120 to be sent to a web server 140 located in a cloud computing environment 145. In the embodiments of the system 100 and method shown in FIG. 1, the sensor data 120 is sent within a web protocol request 150. One example of a web protocol request is a hypertext transport protocol (HTTP) request. Other mechanisms of sending the sensor data 120 to the web server 140 are possible, as described in detail below.

In some embodiments of the system 100 and method, an intermediate server 155 is used. This is an optional component, as indicated by the dashed line around the intermediate server 155. The intermediate server 155 mediates between the embedded device 105 and the web server 140. The intermediate server 155 can modify the sensor data 120 received from the embedded device 105 so that if the web server 140 is a legacy server the sensor data 120 can be understood. Moreover, the intermediate server 155 can modify web pages received from the web server 140 based on the sensor data 120 before sending any content back to the embedded device 105. In some embodiments where the intermediate server 155 is used, the intermediate server 155 may be a proxy server.

The web server 140 includes a web application 160 running on the web server 140. This web application 160 may be a webpage. The web application 160 also includes a web application component 165 of embodiments of the system 100 and method. The web application component 165 receives the web protocol request 150 (or any other method used to send the sensor data 120) containing the sensor data 120 that was sent by the embedded device 105.

The web application component 165 can make decisions about the type of content to serve up to the embedded device 105 based on the received sensor data 120. Moreover, in some embodiments the web application component 165 can make decisions about which of a plurality of embedded devices to send the content. This is discussed in detail below.

The web application component 165 serves up the content for the embedded device 105 along with actuation commands that provide additional feedback for the user 110 when the user 110 is viewing the content on the embedded device 105. These actuation commands are sent to the embedded device 105 and, when instructed by the actuation commands, cause at least one of the actuation mechanisms to activate.

In some embodiments, the web application component 165 places the actuation commands in a web protocol response 170 to the embedded device 105 in response to the web protocol request 150. In some embodiments the web protocol response is an HTTP request. This web protocol request 150 is sent from the web server 140 to the embedded device 105. The embedded device component 135 receives the web protocol request 150 containing the actuation commands and content. The content is displayed to the user 110 and the actuation mechanisms 130 are activated as instructed by the actuation commands received from the web server 140. In this fashion, the web server 140 provides content to the embedded device 105 that is based on the sensor data 120 about the embedded device 105 and has access to the actuation mechanisms 130 on the device 105.

II. Operational Overview

Figure 2:
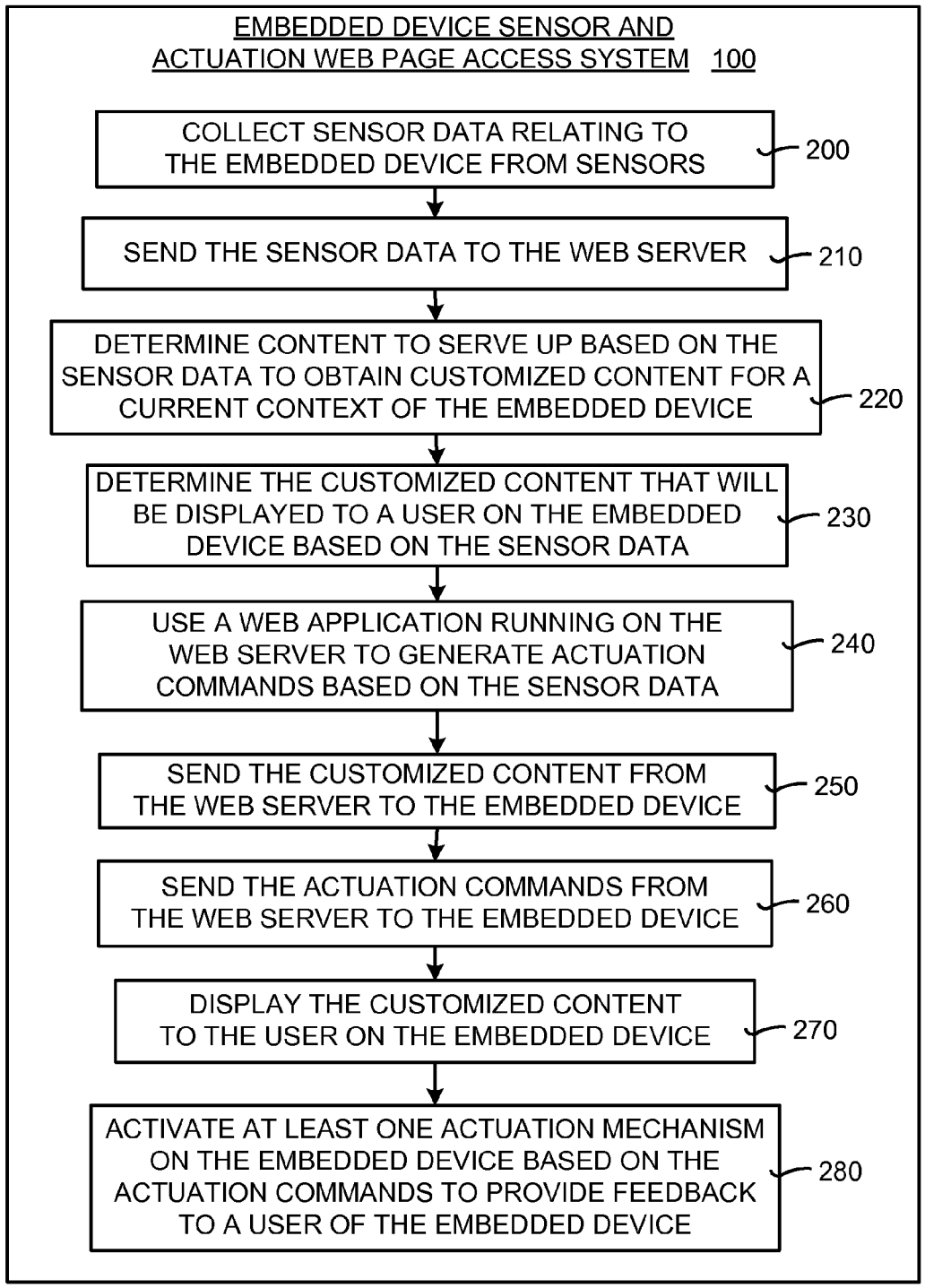
FIG. 2 is a flow diagram illustrating the general operation of embodiments of the embedded device sensor and actuation web page access system and method shown in FIG. 1.

FIG. 2 is a flow diagram illustrating the general operation of embodiments of the embedded device sensor and actuation web page access system 100 and method shown in FIG. 1. As shown in FIG. 2, the operation of embodiments of the embedded device sensor and actuation web page access system 100 and method begins by using sensors to collect sensor data 120 relating to the embedded device 105 (box 200). As noted above, this sensor data 120 is related to the embedded device either directly (such as whether the device 105 is in motion) or indirectly (such as the temperature of the air surrounding the device 105).

The method then provides the sensor data 120 to the web application 160 by sending the sensor data 120 to the web server 140 (box 210). At the web server 140 the sensor data 120 is used to determine the content to be served up by the web server 140 (box 220). Moreover, the method uses the sensor data 120 to customize content to the context of the embedded device 105 (box 230). For example, if the sensor data 120 indicates that context of the embedded device 105 is that the user 110 is walking with the embedded device 105 in his pocket, then the custom context served up by the web server 140 may be turn-by-turn audio directions to the user 110 (since visual content will not be useful to the user 110 with the device 105 in his pocket).

In addition to the custom content, the web application 160 running on the web server 140 also uses the sensor data 120 to generate actuation commands (box 240). These actuation commands can be used to augment the custom content served up to the user 110. For example, when the user 110 interacts with the content clicking on certain content may cause the embedded device 105 to vibrate.

The custom content is send from the web server 140 to the embedded device 105 (box 250). Along with the custom content the actuation commands are sent from the web server 140 to the embedded device 105 (box 260). The custom content and actuation commands are received by the embedded device 105. The custom content then is displayed to the user 110 on the embedded device 105 (box 270). Moreover, when the user interacts with the content, at least one of the actuation mechanisms 130 is activated based on the actuation commands in order to provide feedback to the user 110 of the embedded device 105 (box 280).

III. Operational Details

The operational details of embodiments of the embedded device sensor and actuation web page access system 100 and method will now be discussed. This includes the operation embedded device component 135 and the web application component 165.

III.A. Providing Sensor Data

Providing sensor data 120 about the embedded device 105 to the web server 140 allows a richer and more customized experience for the user 110. The sensor data 120 allows a context of the embedded device 105 to be known or reasonably inferred. In this sense, context of the embedded device 105 means that one of more of following can be determined. Namely, the state of the device 105 (and in some case the user 110) can be determined (such as the user 110 is running or walking), the location of the device 105, the environment surrounding the device 105 (such as the air temperature, if it is windy, if the device 105 is in a pocket or purse, whether there are wireless networks). Thus, the term context is meant to refer broadly to the device 105 and its environs.

Knowing the context about the embedded device 105 allows the web application to customize context for the user 110 and device 105. This means that the same web page requested by the user 110 when the embedded device 105 is in different contexts results in the delivery of different content. For example, different content will be delivered by the web server 140 depending on whether the sensor data indicates that the user 110 is walking, running, or driving.

The web server 140 can also customize the content served up to and displayed on the device 105 based on the sensor data 120 about the embedded device 105. In other words, the web server 140 determines content based on the sensor data 120 about the embedded device 105.

In some embodiments the web server 140 stores the sensor data 120 that it receives. Over time, this storing of the sensor data 120 provides a history of sensor data 120 that is stored on the web server 140. Content can be returned to the embedded device 105 from the web server 140 based on the history of the sensor data 120 that is stored on the web server 140.

The history can be based on stored sensor data 120 from multiple devices that belong to different users, multiple devices that belong to the same user, or some combination thereof. The web server 140 can return content to the embedded device 105 based on sensor data from the most recent request from the embedded device 105 to the web server 140, a history of the sensor data stored on the web server 140, a subset of the history of the sensor data stored on the web server 140, or some combination thereof.

For example, the embedded device 105 could be gathering sensor data 120 and processing this data on the embedded device 105 to determine that the user 110 is running. At some time interval (such as every minute), the embedded device 105 sends the processed sensor data (such as the high-level information "running") to the web server 140. The web server 140 then stores the sensor data 120 received for later use. At some later time, the stored sensor data is used to determine content to that the web server 140 sends to the embedded device 105. For example, the web server 140 may use the stored sensor data to determine a number of calories expended by the user 110 over a period of time and send this number to the embedded device 105.

III.A.1. Types of Context Based on Sensor Data

There are a multitude of sensors available that are capable of providing a variety of sensor data 120 about the embedded device 105. Examples of different types of sensor data 120 are given below. Different types of sensors 115 may be used to determine or infer a context of the embedded device 105. Note that in some cases a plurality of sensors 115 are needed to determine the contexts set forth below.

Initially, it should be noted that the sensors 115 and actuation mechanisms 130 may either be built-in to the device 105 or be a peripheral of the device 105. If the sensors 115 or actuation mechanisms 130 are a peripheral device, it may be in direct communication with the embedded device 105. In other situations the peripheral device may be communicating independently with the web server 140 and the web server 140 would be coordinating the peripheral device (containing the sensors 115, the actuation mechanisms 130, or both) and the embedded device 105).

One type of context is movement related, such as whether the user 110 is running, walking, cycling, driving, on a bus, on a train, on an airplane, sitting, and so forth. Another type of context is an audio environment. This includes using the sensors 115 to determine whether the user 110 is in a conversation, in a noisy or quiet environment, if there is music playing, the type of music playing, whether there is talking, shouting, children crying, dogs barking, and so forth.

Another type of context from sensor data 120 is environment related. This infers whether the user 110 is indoors, outdoors, the temperature, whether it is raining, sunny, windy, and so forth. Some of these contexts may require correlation between sensors 115. For example, sensor data 120 from a barometer and a microphone may help infer that the embedded device 105 is in a windy environment.

One type of context is a social environment. This determines whether the user 110 is with other people or alone, with family, working, in school, and so forth. Another type of context determines the dynamic status of the device 105, such as the battery level signal strength, and so forth of the device 105.

Another type of context is screen orientation related. This includes an angle at which the device 105 is held, such as whether the content is to be displayed in portrait or landscape orientation. Another type is geographic location related, such as the current location, direction that the user 110 is currently heading, and so forth. These types of context are determined using a GPS, compass, magnetometer, gyroscope, and so forth. Moreover, another type of context is a recent movement path. This is a path history determined using a magnetometer and a gyroscope. Still another type of context is based on network connectivity, such that a location and other information can be ascertained based on the networks that are available and their signal strength.

III.A.2. Providing Sensor Data to the Web Server

There are numerous ways in which the sensor data 120 can be provided to the web server 140. One way is to use the dynamic web protocol request 150. In some embodiments, the dynamic web protocol request 150 is an HTTP request. In this situation, the sensor data 120 is contained within the header of the HTTP request. It should be noted that virtually any other protocol that can serve up dynamic web pages may be used in place of the HTTP protocol.

When the sensor data 120 is contained in the HTTP header, it may be encoded using an extensible mechanism. In particular, when information in the HTTP header begins with the term "x-", then whatever information follows will be understood by the web server as additional information. This is a well-defined way for adding information to the HTTP header. If the web server 140 (or any other machine processing the HTTP request) does not understand the "x-" designation, then that machine will simply ignore it. This provides a lightweight way for to provide the sensor data 120 to the web server 140 by merely modifying the HTTP header.

In other embodiments, the sensor data 120 is encoded as part of the uniform resources locator (URL). For example, the temperature could be encoded as part of the URL string in the user's request for a web page. This involves generating a URL string containing the URL of a website hosted on the web server 140. Next, the sensor data 120 is encoded in the URL string to obtain an encoded URL string. Finally, the encoded URL string is sent from the embedded device 105 to the web server 140 in order to provide the web server 140 with the sensor data 120.

III.A.3. Pre-Processing Sensor Data

The sensor data 120 may be sent to the web server 140 without processing or may be pre-processed by the embedded device 105 and then sent to the web server 140. If the sensor data 120 is pre-processed, it is generally more high-level data that the raw sensor data.

For example, rather than sending light data from a light sensor and accelerometer data to the web server 140, pre-processing would indicate that that the context of the device 105 is that the user 110 is walking with the device 105 in his pocket. The information that the user 110 is walking and the device 105 is in his pocket would be sent to the web server 140 as sensor data 120, rather than the raw sensor data. Pre-processing of sensor data 120 may occur on the embedded device 105 before the sensor data 120 is sent to the web server 140. Alternatively, the sensor data 120 may be sent to the web server 140 and then processed on the web server 140 before being provided to the web application 160.

III.B. Providing Actuation Data

Providing the web application 160 with access to the actuation mechanisms 130 also allow a richer and more customized experience for the user 110 when interacting with a web page or website. This provides websites with the ability to use actuation mechanisms 130 for the embedded device 105, such as vibration motors, calling, sending text messages and emails.

The web application 160 generates actuation commands based on the sensor data 120 and then send the actuation commands to the embedded device 105. The embedded device 105 displays the web page. The actuation mechanisms 130 are activated based on the user's interaction with the web page. This provides the user 110 with real-time feedback during interaction with the web page.

III.B.1. Providing Actuation Data from the Web Server

There are numerous ways in which the actuation data (or commands) can be sent from the web server 140 to the embedded device 105. One way is to use the dynamic web protocol response 170. In some embodiments, the dynamic web protocol response 170 is an HTTP response. In this situation, the actuation commands are contained within the header of the HTTP response. It should be noted that virtually any other protocol that can serve up dynamic web pages may be used in place of the HTTP protocol. As noted above, when the actuation commands are contained in the HTTP header, it may be encoded using an extensible mechanism (such as the "x-" term discussed above).

In other embodiments, the actuation commands are sent back to the embedded device 105 by modifying the return value of the web page. In other embodiments, the response code of the HTTP protocol could be used to send the actuation commands. Moreover, in other embodiments, the content of the web page itself can be changed by placing some metadata in the web page to tell the device to actuate.

Actuation mechanisms include powering on the embedded device 105, powering off the embedded device 105, causing a vibration mechanism to vibrate the embedded device 105, and placing the embedded device 105 in a standby mode. This means that the web server 140 can send actuation commands in order to power on, off, vibrate, or place the embedded device 105 in a standby mode. actuation commands. Moreover, in other embodiments, the content of the web.

III.C. Embedded Device Component

Figure 3:
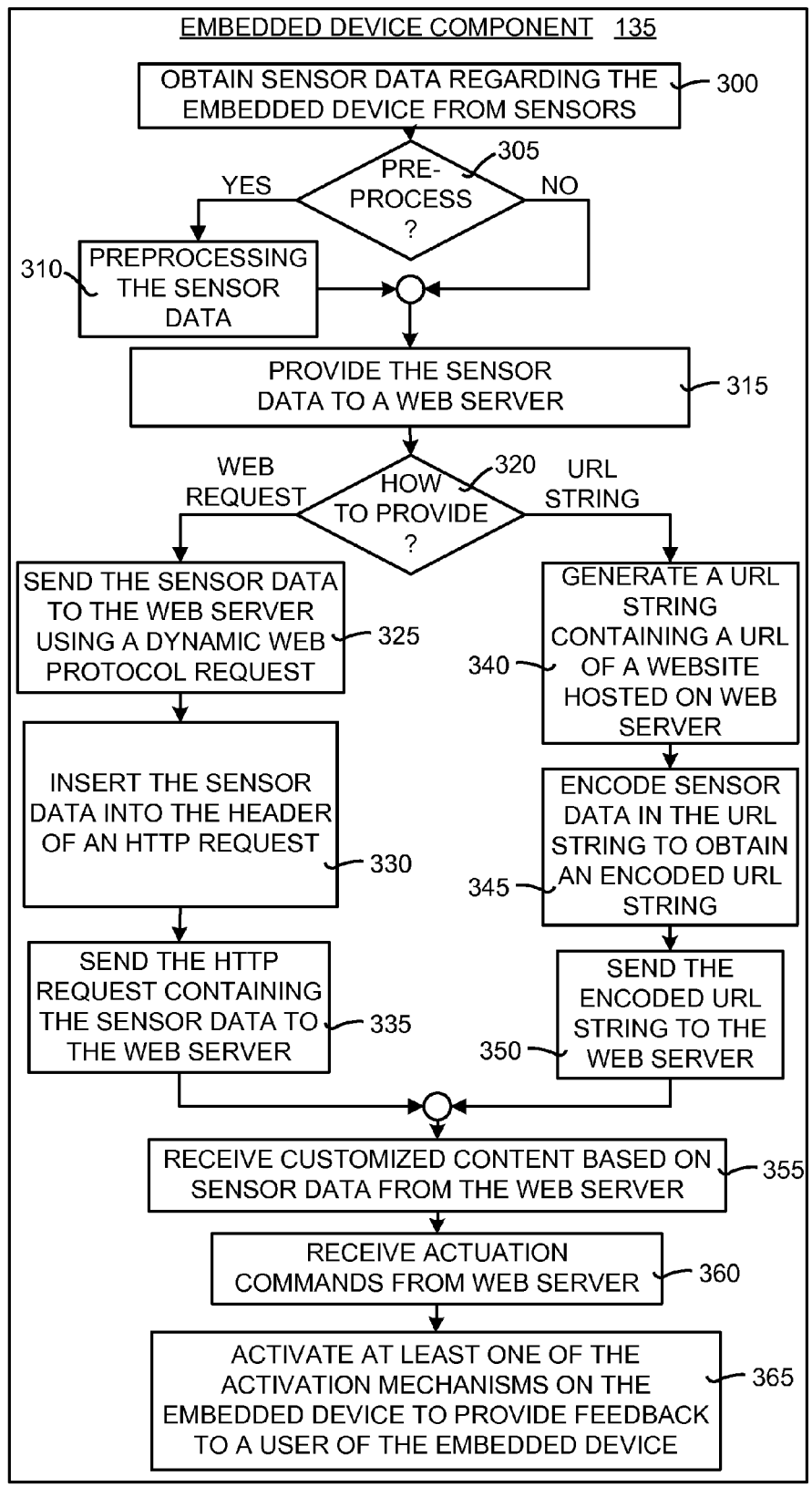
FIG. 3 is a flow diagram illustrating the operational details of embodiments of an embedded device component of embodiments of the embedded device sensor and actuation web page access system and method that is shown in FIG.

FIG. 3 is a flow diagram illustrating the operational details of embodiments of the embedded device component 135 of embodiments of the embedded device sensor and actuation web page access system 100 and method that is shown in FIG. 1. The operation begins by obtaining sensor data 120 regarding the embedded device 105 from the sensors 115 (box 300). A determination then is made as to whether the sensor data 120 will be pre-processed (box 305). If so, then the sensor data 120 is pre-processed before sending (box 310). Otherwise, the sensor data 120 is provided to the web server 140 (box 315).

Another determination is made as to how to provide the sensor data 120 (box 320). If by web request, then the sensor data 120 is sent to the web server 140 using the dynamic web protocol request 150 (box 325). This can be done by inserting the sensor data 120 into the header of an HTTP request (box 330). This HTTP request containing the sensor data 120 then is sent to the web server 140 (box 335).

If by URL string, then the method generates a URL string containing a URL of a website that is hosted on the web server 140 (box 340). Next, the sensor data 120 is encoded in the URL string to obtain an encoded URL string (box 345). The encoded URL string then is sent to the web server 140 (box 350).

Regardless of how the sensor data 120 is provided to the web server 140, the web application 160 generates custom content based on the sensor data 120 and this custom content is received from the web server 140 (box 355). In addition, the actuation commands are received from the web server 140 (box 360). At least one of the actuation mechanisms 130 on the embedded device 105 are activated by the embedded device component 135 in accordance with the actuation commands (box 365). This provides feedback to the user 110 of the embedded device 105.

III.D. Web Application Component

Figure 4:
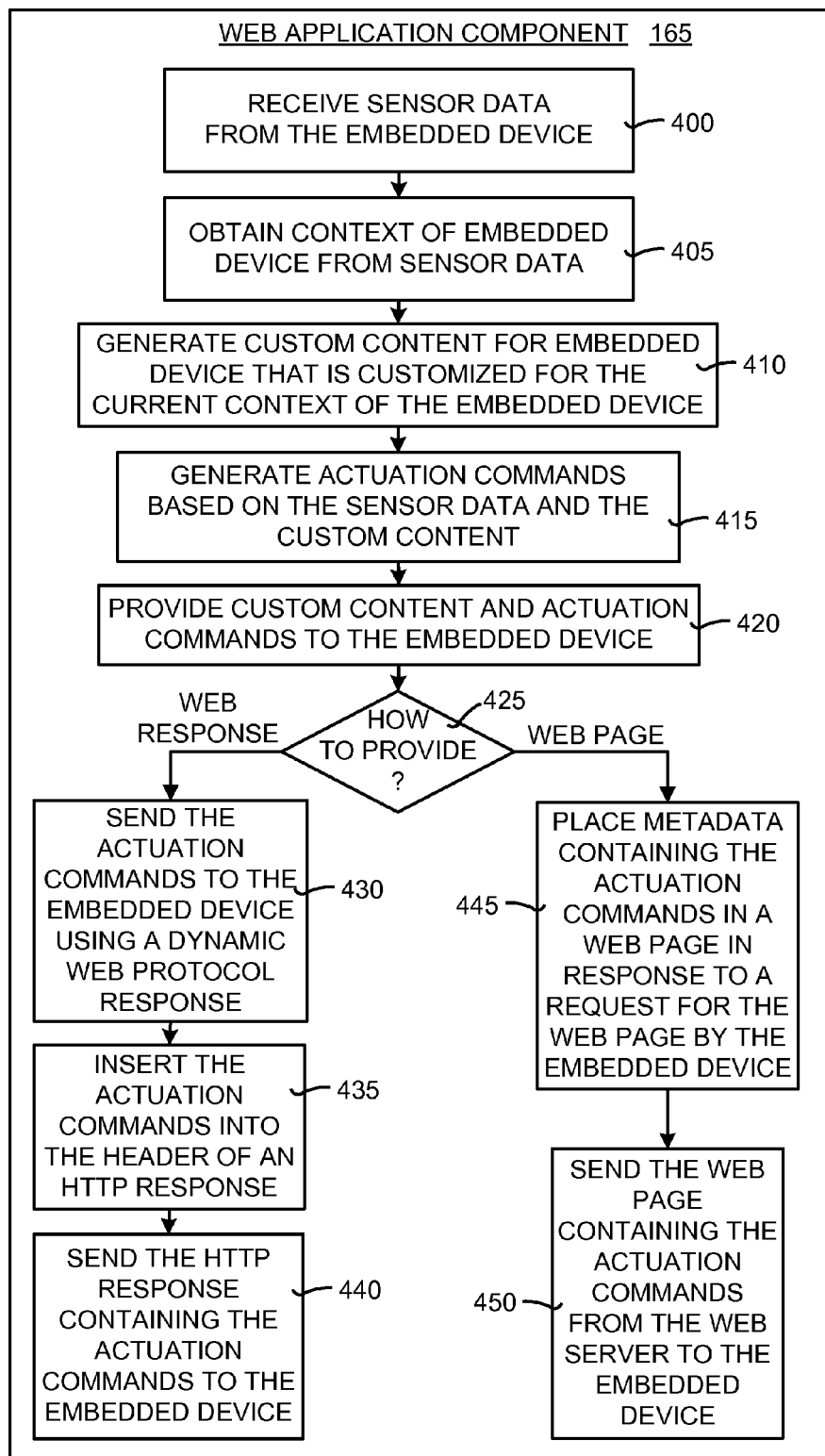
FIG. 4 is a flow diagram illustrating the operational details of embodiments of a web application component of embodiments of the embedded device sensor and actuation web page access system and method shown in FIG. 1.

FIG. 4 is a flow diagram illustrating the operational details of embodiments of the web application component 165 of embodiments of the embedded device sensor and actuation web page access system 100 and method shown in FIG. 1. The web application component 165 runs on the web application 160 and controls the operation of embodiments of the system and method on the web server 140.

Referring to FIG. 4, the operation begins by receiving the sensor data 120 from the embedded device 105 (box 400). The context of the embedded device 105 then is obtained from the sensor data 120, either directly or inferred (box 405). The web application component 165 then generates custom content for the embedded device 105 that is customized for the current context of the device 105 (box 410). In addition, actuation commands are generated based on the sensor data 120 and the custom content (box 415).

The web operation component 165 then provides the custom content and actuation commands to the embedded device 105 (box 420). The custom content is provided in the traditional manner. However, for the actuation commands, a determination is made as to how this information is provided (box 425). If by web response, then the component 165 sends the actuation commands to the embedded device 105 using a dynamic web protocol response (box 430). This is done by inserting the actuation commands into the headers of an HTTP response (box 435). The HTTP response containing the actuation commands then is sent to the embedded device 105 (box 440).

If by web page, then the component 165 places metadata containing the actuation commands into a web page (box 445). This web page is a web page that was requested by the user 110 of the embedded device 105. In other words, the web page is in response to a request by the user for the web page. The web page containing the actuation commands then is sent from the web server 140 to the embedded device 105 (box 450).

III.E. Situations Using Sensor Data and Actuation Commands

Specific situations in which embodiments of the embedded device sensor and actuation web page access system 100 and method will now be discussed. It should be noted that these situations are merely exemplary embodiments of the system 100 and method. A virtually endless number of other situations are possible, and will be evident from the disclosure herein.

A first situation assumes that the user 110 is lost in a city, and takes her embedded device 105 out to obtain directions. The web application indicates the path that the user 110 would take to get to her destination. If the user 110 puts the embedded device 105 in her pocket, then embodiments of the system 100 and method will determine this and communicate this fact to the website providing the directions. Instead of updating the screen of the embedded device 105 by showing that the user 110 is moving along the map, the website would provide verbal content and cues (such as beeping when you reach the next waypoint). Or, the website could provide both audio and haptic cues, such as beeping and vibrating when the user 110 reaches a waypoint or turn.

This is done automatically without the user 110 realizing what is going on and without the user having to provide any manual input. In some embodiments, this option is presented to the user 110 beforehand and when the user accepts then this starts working the next time the user accesses the website.

A second situation assumes that the user 110 is at a railway station and wants to go to a destination. The user 110 would give his embedded device 105 a starting point and destination. This starting location is used to know that the user is leaving from the railway station soon.

Embodiments of the system 100 and method would begin giving data about trains leaving soon from that particular railway station. Moreover, if embodiments of the system 100 and method determine that the user 110 is running, then it deduces that the user 110 may be late for a train. Or, through mechanisms such as cookies or other behavior tracking, embodiments of the system 100 and method may know that the user 110 catches this particular train every weekday. When the user 110 takes his embedded device 105 out of his pocket, the device 105 would audibly report to the user 110 that he was "heading to platform #9 and that your train leaves in 2 minutes."

A third situation involves an alternate embodiment that is also discussed below. This situation assumes that there are two users each having their own embedded devices that are in communication with the single web application 160. Both users are trying to find and be guided to each other.

Assume that each of the users has allowed location sharing that gives an authorization or token to a website so that the two persons are continually routed to each other. The current device's location for one person would be used as the destination or endpoint for the other person. This guides the two users to each other, and is enabled through a standard website using embodiments of the system 100 and method.

A fourth situation assumes that a user 110 asks her device 105 for turn-by-turn directions. The sensors 115 are used to determine if the user is walking, running, or driving. If the user 110 is walking, the web application 160 provides walking direction. If the user 110 is running, the web application 160 provides directions that may be simplified, larger, and provide audio directions. If the user 110 is driving, the web application 160 provides the user 110 with driving directions. Different types of accelerometer patterns allow the device to decide if the user if walking, running, driving, and so forth.

III.F. Other Embodiments

This section discusses alternate embodiments of the embedded device sensor and actuation web page access system 100 and method.

III.F.1. Intermediate Server

Some embodiments of the embedded device sensor and actuation web page access system 100 and method include the intermediate server 155, discussed above in connection with FIG. 1. This intermediate server 155 typically is used if the web server 140 cannot understand the way in which the sensor data 120 was sent to the web server 140. The intermediate server essentially mediates between the embedded device 105 and the web server 140. The intermediate server 155 modifies web pages received from the web server 140 based on the sensor data 120. In some embodiments the intermediate server 155 is a proxy server.

III.F.2. Other Types of Data

Sensor data 120 is not the only type of data about the embedded device 1045 that can be provided to the web server 140. In some embodiments, the data includes a request for a mobile device URL, which is a mobile version of the website optimized for viewing on a mobile device. In some embodiments the user 110 manually specifies the mobile URL, while in other embodiments the website automatically knows the type of mobile device because this information is encoded in the HTTP header.

III.F.3. One User—Multiple Embedded Devices

Some embodiments of the system 100 and method involve a single user 110 that is using multiple embedded devices. This may occur if the user 110 is using two or more types of smartphones and a tablet PC. This information may be provided to the web server 140 through the HTTP header. If the web application 60 knows that the same user using multiple embedded devices, and that the multiple embedded devices have different output capabilities, then the web application 160 can send content to one embedded device over the others based on the context of each embedded device.

In particular, the web server 140 is provided with additional sensor data 120 about a current context of the multiple embedded devices being used by the same user 110. The web application 160 receives requests from the multiple embedded devices and sends different content and actuation commands to the different devices based on the additional sensor data 160 and the current context of each device.

Embodiments of the system 100 and method can also provide the web server 140 with information about which device currently has the user's attention (in other words, which device the user 110 is currently looking at or using). The web application 160 will then provide content based on this information and send the content to that device. This may include providing sending blank content or an actuation command to place the embedded devices that do not have the user's attention in standby mode (in order to same power). Moreover, embodiments of the system 100 and method can have the web application 160 send the content to one or more of the multiple embedded devices and coordinate the content among them.

III.F.4. Multiple Users—Multiple Embedded Devices

Some embodiments of the system 100 and method involve multiple users that are each using an embedded device. This extends the concept of a single user 110 with a single embedded device 105. The web server 140 receives sensor data 120 from each of the multiple embedded devices. Thus, content is not only presented by the web application 160 based on a single user's context, but on other user's context as well. Once again, this model assumes that this type of sharing has been approved and enabled by the users.

The web application 160 can also using the context of the multiple embedded devices to providing coordinated content to the multiple devices. This coordinated content is based on the additional sensor data provided to the web server 140.

III.F.5. Historical Context

As noted above, some embodiments of the system 100 and method provide the web server 140 with historical sensor data about the embedded device 105 based on previous sensor data. This enables the web application 160 to know the historical context of the embedded device 105 over some previous time period. This information allows the web application 160 to further customize the user's experience.

The web server 140 may store many types of information associated with a request from the user 110 and the sensor data provided. For example, information such as the time of day, the IP address of the requester, and some other type of identification of the requester. In addition, the web server may store information such as the name of the server that the requester addressed. For example, the requester may address "Celsius.com" when providing a temperature to the web server 140. This is important to know if the temperature received is "39, such that the web server 140 would know it was 39 Celsius not 39 Fahrenheit.

IV. Exemplary Operating Environment

Figure 5:
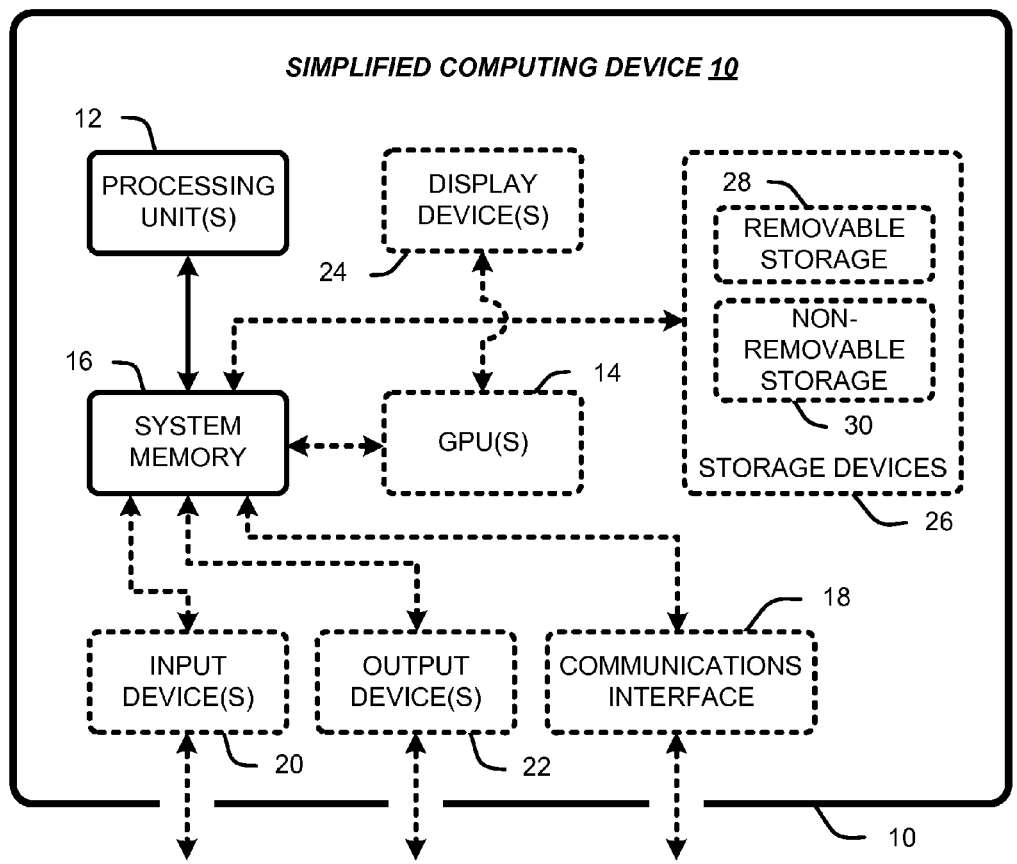
FIG. 5 illustrates a simplified example of a general-purpose computer system on which various embodiments and elements of the embodiments of the embedded device sensor and actuation web page access system and method, as described herein and shown in FIGS. 1-4, may be implemented.

Embodiments of the embedded device sensor and actuation web page access system 100 and method described herein are operational within numerous types of general purpose or special purpose computing system environments or configurations. FIG. 5 illustrates a simplified example of a general-purpose computer system on which various embodiments and elements of the embedded device sensor and actuation web page access system 100 and method, as described herein and shown in FIGS. 1-4, may be implemented. It should be noted that any boxes that are represented by broken or dashed lines in FIG. 5 represent alternate embodiments of the simplified computing device, and that any or all of these alternate embodiments, as described below, may be used in combination with other alternate embodiments that are described throughout this document.

For example, FIG. 5 shows a general system diagram showing a simplified computing device 10. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, mini-computers, mainframe computers, audio or video media players, etc.

To allow a device to implement embodiments of the embedded device sensor and actuation web page access system 100 and method described herein, the device should have a sufficient computational capability and system memory to enable basic computational operations. In particular, as illustrated by FIG. 5, the computational capability is generally illustrated by one or more processing unit(s) 12, and may also include one or more GPUs 14, either or both in communication with system memory 16. Note that that the processing unit(s) 12 of the general computing device of may be specialized microprocessors, such as a DSP, a VLIW, or other microcontroller, or can be conventional CPUs having one or more processing cores, including specialized GPU-based cores in a multi-core CPU.

In addition, the simplified computing device of FIG. 5 may also include other components, such as, for example, a communications interface 18. The simplified computing device of FIG. 5 may also include one or more conventional computer input devices 20 (e.g., pointing devices, keyboards, audio input devices, video input devices, haptic input devices, devices for receiving wired or wireless data transmissions, etc.). The simplified computing device of FIG. 5 may also include other optional components, such as, for example, one or more conventional computer output devices 22 (e.g., display device(s) 24, audio output devices, video output devices, devices for transmitting wired or wireless data transmissions, etc.). Note that typical communications interfaces 18, input devices 20, output devices 22, and storage devices 26 for general-purpose computers are well known to those skilled in the art, and will not be described in detail herein.

The simplified computing device of FIG. 5 may also include a variety of computer readable media. Computer readable media can be any available media that can be accessed by computer 10 via storage devices 26 and includes both volatile and nonvolatile media that is either removable 28 and/or non-removable 30, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the embedded device sensor and actuation web page access system 100 and method described herein, or portions thereof, may be stored, received, transmitted, or read from any desired combination of computer or machine readable media or storage devices and communication media in the form of computer executable instructions or other data structures.

Finally, embodiments of the embedded device sensor and actuation web page access system 100 and method described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

Moreover, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for providing contextual data to an embedded device, comprising:
    obtaining, by a web server, sensor data about a current context of an embedded device from at least one sensor associated with the embedded device, wherein the sensor data is included as part of an HTTP request for content;
    determining, by the web server, content to serve up to the embedded device based on the HTTP request;
    customizing the determined content according to the current context of the embedded device as determined by the obtained sensor data;
    generating, by the web server, actuation commands based on the obtained sensor data, the actuation commands facilitating access to actuation mechanisms contained on the embedded device, and
    sending, by the web server, the customized content and actuation commands to the embedded device.

2. The method of claim 1, further comprising inserting the sensor data into a header of the HTTP request from the embedded device to the web server.

3. The method of claim 1, further comprising:
    generating a URL string containing a URL of a website hosted on the web server;
    encoding sensor data in the URL string to obtain an encoded URL string; and
    sending the encoded URL string from the embedded device to the web server to provide the web server with the sensor data.

4. The method of claim 1, further comprising:
    determining the customized content that will be displayed to a user on the embedded device based on the sensor data; and
    displaying the customized content to the user.

5. The method of claim 1, further comprising providing a web application running on the web server with access to raw sensor data that has not been processed.

6. The method of claim 1, further comprising:
    preprocessing the sensor data within the embedded device to obtain processed sensor data; and
    providing a web application running on the web server with access to processed sensor data.

7. The method of claim 1, further comprising:
    providing to the web server additional sensor data about a current context of additional embedded devices being used by multiple users; and
    using a web application running on the web server to provide coordinated content to the multiple users through the additional embedded devices based on the additional sensor data.

8. The method of claim 1, further comprising:
    providing to the web server additional sensor data about current context of multiple embedded devices being used by a same user that is using the embedded device; and
    serving the customized content from the web server to the multiple embedded devices and the embedded device based on the current context of the multiple embedded devices being used by the same user.

9. The method of claim 8, further comprising:
detecting which of the multiple embedded devices currently have the user's attention based on the additional sensor data; and
sending an actuation command from the web server to any of the multiple embedded devices that currently do not have the user's attention to place them in a standby mode.

10. The method of claim 8, further comprising:
using the web application to provide coordinated content to the same user through the multiple embedded devices based on the additional sensor data; and
sending the coordinated content from the web server to the multiple embedded devices and the embedded device in order to coordinate an output between the multiple embedded devices and the embedded device.

11. The method of claim 1, further comprising:
collecting the sensor data from at least one sensor located on the embedded device;
placing the sensor data into a header of an HTTP request for a web page by a user of the embedded device;
sending the HTTP request containing the sensor data over the Web to the web server to provide the sensor data to the web server;
determining the customized content to be displayed on the requested web page based on the sensor data to obtain a custom web page that is customized for the embedded device based on the sensor data;
generating actuation commands to augment the customized content on the custom web page;
placing the actuation commands in a header of an HTTP response; and
sending the HTTP response containing the actuation commands along with the custom web page from the web server to the embedded device.

12. A method for providing actuation commands to an embedded device, comprising:
using a web application running on a web server:
obtaining sensor data about a current context of the embedded device from at least one sensor associated with the embedded device, wherein the sensor data is included as part of a request for content;
determining content to serve to the embedded device based on the sensor data;
customizing the determined content according to the current context of the embedded device based on the obtained sensor data;
generating actuation commands, the actuation commands based on the obtained sensor data and facilitating access to actuation mechanisms contained on the embedded device; and
sending the customized content and actuation commands to the embedded device.

13. The method of claim 12, further comprising activating at least one actuation mechanism on the embedded device based on the actuation commands in order to provide feedback to a user of the embedded device.

14. The method of claim 13, further comprising using the actuation commands to power off the embedded device, power on the embedded device, place the embedded device in a standby mode, or cause the embedded device to vibrate.

15. The method of claim 13, further comprising inserting the actuation commands into a header of an HTTP response from the web server to the embedded device.

16. The method of claim 13, further comprising:
placing metadata containing the actuation commands in a web page in response to a request by the embedded device for the web page; and
sending the web page from the web server to the embedded device.

17. A method for making sensor data about an embedded device available to a web server, comprising:
collecting sensor data about a current context of an embedded device using at least one sensor associated with the embedded device;
sending an HTTP request for content to a web application operating on a web server, wherein the sensor data is included in the header of the HTTP request for content;
receiving an HTTP response comprising the requested content, wherein the requested content is customized according to the current context of the embedded device as defined by the sensor data, wherein the HTTP response further comprises at least one actuation command for implementation on the embedded device, and wherein the at least one actuation command is included in the header of the HTTP response; and
implementing the at least one actuation command via at least one actuation mechanism on the embedded device.

18. The method of claim 17, further comprising returning content from the web server to the embedded device based on a history of sensor data stored on the web server.

19. The method of claim 17, further comprising:
receiving a request from the embedded device to the web server; and
returning content from the web server to the embedded device based on sensor data contained in the request and a subset of a history of sensor data stored on the web server.

* * * * *